United States Patent [19]
Guzowski et al.

[11] Patent Number: 5,670,202
[45] Date of Patent: Sep. 23, 1997

[54] METHOD AND SYSTEM FOR SPRAYING MATERIAL IN A SPRAY PATTERN HAVING A VARIABLE FORM AND COLLECTING EXCESS MATERIAL

[75] Inventors: Raymond J. Guzowski, Fenton; David W. Lazar, Troy, both of Mich.

[73] Assignee: FANUC Robotics North America, Inc., Auburn Hills, Mich.

[21] Appl. No.: 585,883

[22] Filed: Jan. 16, 1996

Related U.S. Application Data

[62] Division of Ser. No. 270,007, Jul. 1, 1994, Pat. No. 5,536,315.

[51] Int. Cl.[6] .................... B05D 1/02; B05D 1/32
[52] U.S. Cl. .................... 427/8; 427/282; 427/421; 427/424
[58] Field of Search .................... 427/282, 421, 427/8, 428, 424; 118/312, 301, 326, 669, 678; 239/103

[56] References Cited

U.S. PATENT DOCUMENTS 4,472,451  9/1984  Mulder .................... 427/28
5,175,018  12/1992  Lee et al. .................... 427/8

*Primary Examiner*—Shrive Beck
*Assistant Examiner*—Fred J. Parker
*Attorney, Agent, or Firm*—Howard & Howard

[57] ABSTRACT

A variable form spray system includes a robot manipulator, a masking tool assembly integrated with the manipulator, sealer supply hardware which supplies spray material to the manipulator and sealer recovery hardware which recovers material sprayed and skived by the masking tool assembly. Spray pattern form is controlled by collecting overspray using adjustable skive manifolds of the assembly on each side of the spray pattern which function to vacuum off the edges of the airless spray pattern. The positions of the skive manifolds are programmable.

18 Claims, 5 Drawing Sheets

METHOD AND SYSTEM FOR SPRAYING MATERIAL IN A SPRAY PATTERN HAVING A VARIABLE FORM AND COLLECTING EXCESS MATERIAL

This application is a divisional of U.S. patent application Ser. No. 08/270,007, filed Jul. 1, 1994, now U.S. Pat. No. 5,536,315.

TECHNICAL FIELD

This invention relates to methods and systems for spraying material and, in particular, to methods and systems for spraying material in a spray pattern having a variable form and collecting excess material

BACKGROUND ART

The application of vinyl lower body coating (stonechip) material and underbody materials in the automotive paint process to provide a well defined edge require precise location of the material being applied.

Overspray of material traditionally has been controlled by using masking materials, or masking devices to insure application of material in the proper locations. Masking materials include masking tape, paper, and Styrofoam plugs. Masking devices also include rotating disks, belts, and stationary shields.

The airless spray process inherently has variables that make repeatable application of spray coatings difficult from job-to-job. The application of masking materials to contain the application is expensive due to both labor and material costs. Mechanical masking is also expensive in both capital investment and maintenance costs to support production.

Some prior art systems use a rotary mask device to mask the body side. For example, the U.S. Pat. No. 4,974,532 to March, discloses a self-cleaning mask arrangement for use on a robot. Excess material sprayed by an airless spray tip is collected on a rotating disk and scraped into a recovery cup for reuse. In another example, the U.S. Pat. No. 5,175,018 to Lee et al. discloses a robotic masking system used when spraying PVC stonechip material. In one embodiment, this system sprays air at the object to be coated, thereby forming an air masking curtain. A recovery system is also discussed.

The U.S. Pat. No. 4,269,874 to Pryor et al. shows a vacuum for sucking excess spray off of a mask.

The U.S. Pat. No. 1,803,967 to Good, Hammers (U.S. Pat. No. 1,828,463) and Sheetz (U.S. Pat. No. 3,583,634) each disclose spray nozzles of various designs including both spray pattern restrictors and material recovery systems.

The U.S. Pat. No. 5,098,024 to MacIntyre et al. shows a robot with an arm supporting a spray gun for programmable spraying within cavities.

The prior art generally has the following shortcomings:

1. The masking device is very cumbersome and can only be used in limited orientations.

2. The material recovery cup relies on gravity for collecting excess material.

3. The masking device can only mask one side of the airless spray pattern limiting the precision of the mask due to viscosity, tip, and pressure variations.

4. The masking does not have the capability to change the mask location relative to the spray pattern. This results in fixed spray width on one side of the spray application.

SUMMARY OF THE INVENTION

An object of the present invention is to solve many of the problems of the prior art by providing a method and system for spraying material wherein a variable spray pattern form is precisely controlled using a simple masking tool assembly mounted together with a spray applicator on a robot for the application of a coating material such as stonechip and underbody coatings.

Another object of the present invention is to provide a method and system for spraying material in a spray pattern having a variable form wherein the system has reduced cost and complexity, combined with a more simple and flexible process or method.

In carrying out the above objects and other objects of the present invention, a method is provided for spraying material in a spray pattern having a variable form. The method includes the steps of providing material supply apparatus for supplying the material, spraying the material along a spray path in the spray pattern, providing masking means for obstructing the spray path of the material, and generating a first set of control signals representing a desired width of the spray pattern. The method also includes the step of moving the masking means in response to the first set of control signals to obstruct the spray path of the material adjacent an edge of the spray pattern to vary the form of the spray pattern.

Still further in carrying out the above objects and other objects of the present invention, a system is provided for spraying material in a spray pattern having a variable form and collecting excess material. The system includes material supply apparatus for supplying the material, and a spray applicator fluidly coupled to the supply apparatus for spraying the material in the spray pattern. A masking tool assembly is coupled to the spray applicator and includes first and second skive manifolds having adjustable positions relative to the spray applicator for masking portions of the spray pattern of the material and collecting excess material during spraying by the spray applicator. A controller is provided for generating a first set of control signals. The system further includes a drive mechanism adapted to receive the first set of control signals to adjust the positions of the first and second skive manifolds to vary the form of the spray pattern.

The method and system of the invention provides numerous advantages. For example, the masking tool assembly improves process control and increases the efficiency of the application by recovering a majority of the over spray created in the process. The flexibility of the masking tool assembly provides a solution to coat underbodies that cannot be coated with a rotary mask tool. Also, the masking tool assembly is small compared to a rotary mask and can be used with smaller, less expensive robot manipulators.

The above objects and other objects, features, and advantages of the present invention are readily apparent from the following detailed description of the best mode for carrying out the invention when taken in connection with the accompanying drawings.

BEST MODE FOR CARRYING OUT THE INVENTION

Figure 1:
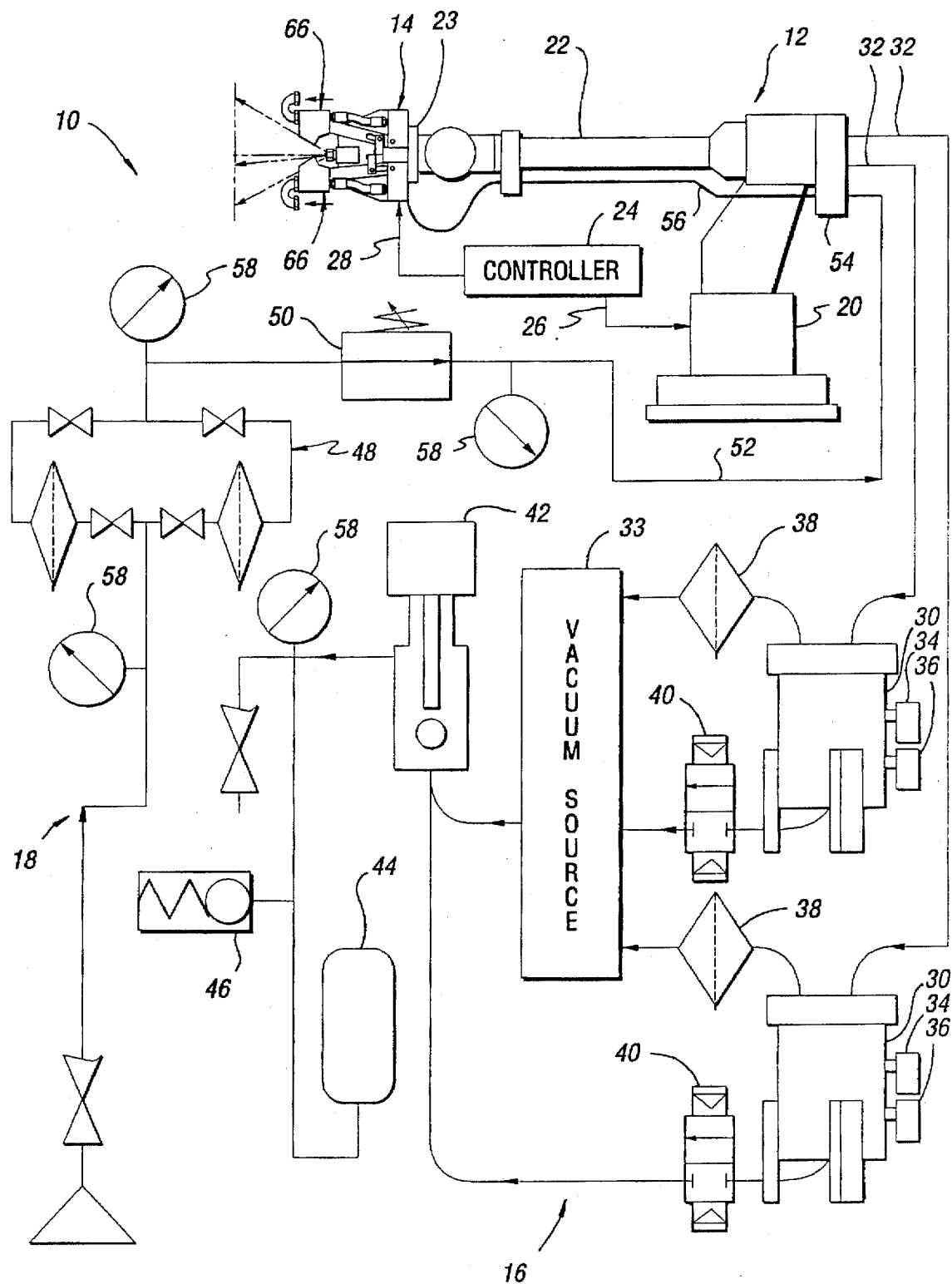
FIG. 1 is a schematic diagram illustrating a system of the present invention.

Referring now to the drawing figures, there is illustrated in FIG. 1 a variable width spray system, generally indicated at 10. The system 10 includes a robot manipulator, generally indicated at 12, a masking tool assembly, generally indicated at 14, sealer recovery hardware, generally indicated at 16, and sealer supply hardware, generally indicated at 18.

The robot manipulator 12 includes a base 20 on which there is mounted for movement a robot arm 22 on which the masking tool assembly 14 is mounted at a distal end thereof by means of a safety clutch 23.

A programmable robot controller 24 generates robot control signals along line 26 to control the motion of the robot manipulator 12. The robot controller 24 also provides at least one control signal along line 28 to control the masking tool assembly 14 or a second embodiment of a masking tool assembly 14' as discussed in greater detail hereinbelow.

The sealer recovery hardware 16 includes a pair of recovery tanks 30 for storing sealer recovered along lines 32 which extend between the recovery tanks 30 and the robot arm 22. A vacuum source 33 is fluidly coupled to the masking tool assembly 14 through the recovery tanks 30 and the lines 32 to suck the sealer through the lines 32 and into the recovery tanks 30.

The amount of sealer contained in the recovery tanks are sensed by high level sensors 34 and low level sensors 36.

Filters 38 are provided for filtering the air in the upper portion of the recovery tanks 30 as it flows to the vacuum source 33. A material valve 40 is provided between each of the recovery tanks 30 and a recovery pump 42 which pumps material from the recovery tanks 30, through the material valves 40 and into an accumulator 44 of the sealer supply hardware 18.

The sealer supply hardware 18 also includes a check valve 46 through which the material accumulated in the accumulator 44 flows to a filter stand, generally indicated at 48. The filter stand 48 filters the sealer material as the sealer material travels to a spray pressure regulator 50 along sealer supply line 52 to a manifold 54 through which the supplied sealer material flows to the masking tool assembly 14 and through which the recovered sealer material flows back to the sealer recovery hardware 16.

From the manifold 54, the sealer material flows through a hose 56 to the masking tool assembly 14.

A number of pressure gauges 58 are located throughout the sealer supply hardware to provide an indication of the pressure of the sealer material therein.

Figure 2:
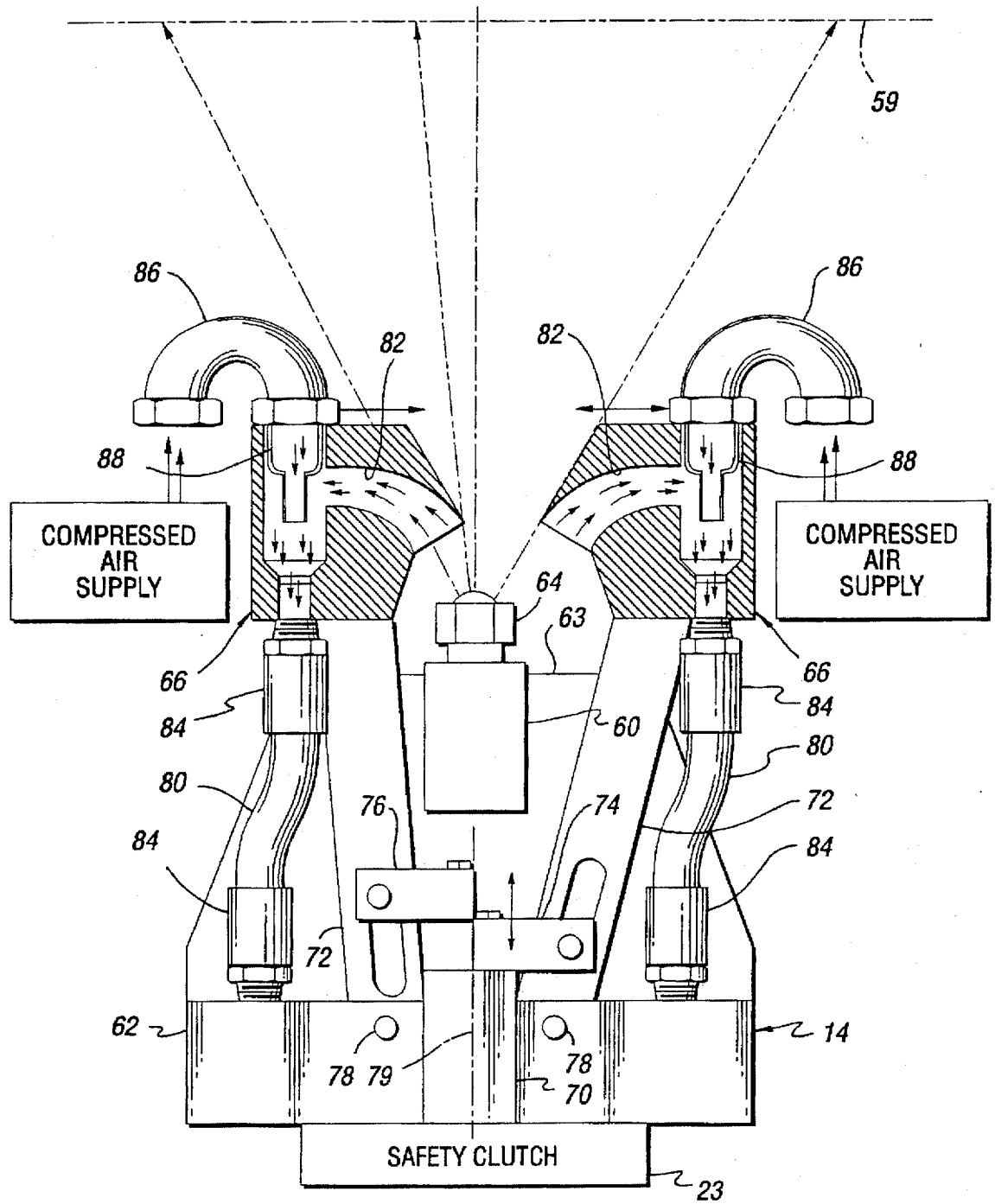
FIG. 2 is a schematic diagram of an assembly, partially in cross-section, having single servo-cylinder control for symmetrical spray width control, for use in the system of FIG. 1.
Figure 3:
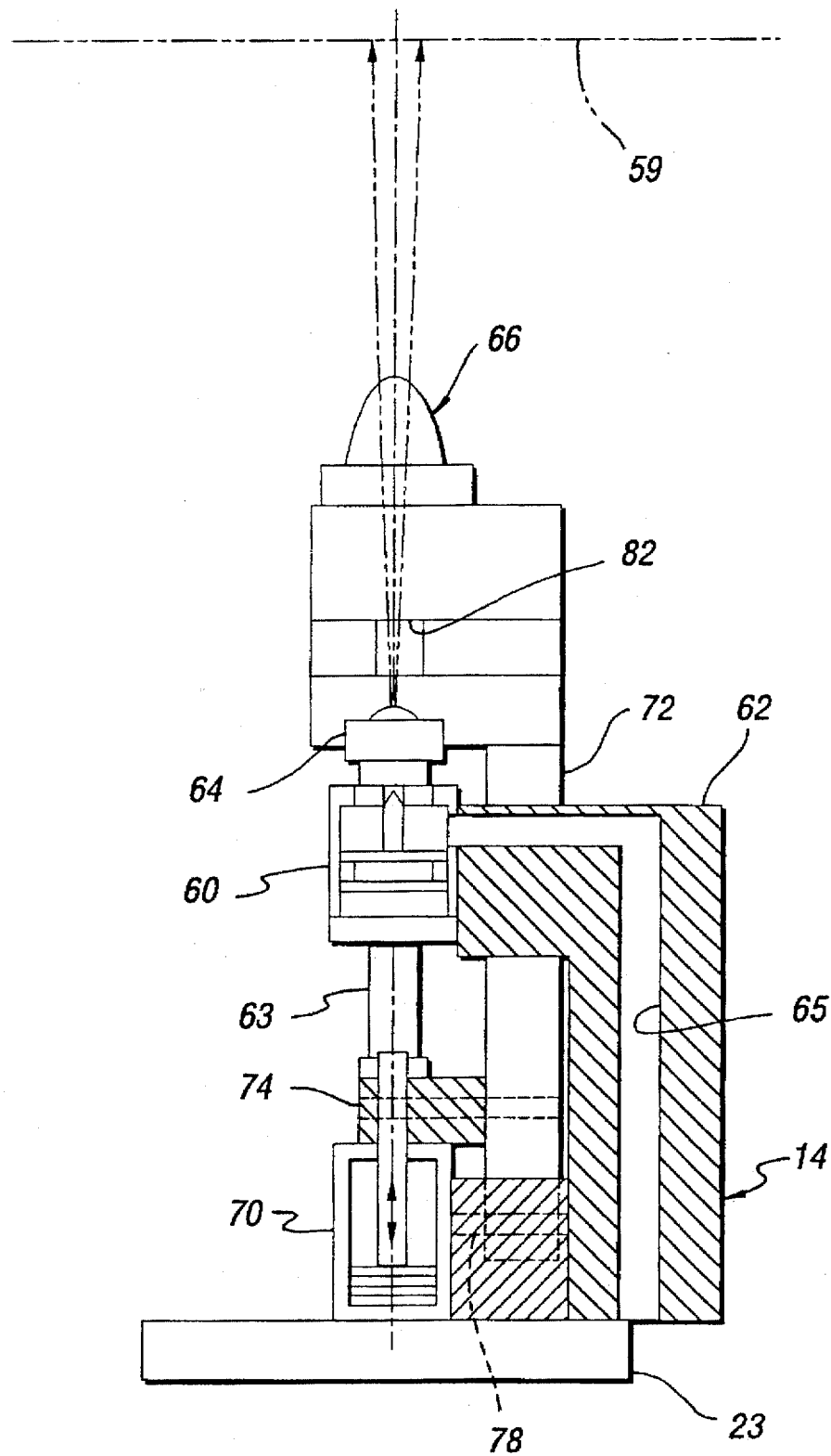
FIG. 3 is a schematic diagram of a single servo-cylinder, partially in cross-section, for symmetrical spray width applications and for use in the assembly of FIG. 2.

Referring now to FIGS. 2 and 3, the system 10 functions by spraying material on a workpiece, indicated in phantom at 59, such as a vehicle body using a conventional airless spray applicator or gun 60. The gun 60 is mounted on a supply and recovery material manifold 62 by a bracket 63 of the tool assembly 14. The manifold 62 supplies the material to the spray gun 60 through a passage 65. A spray tip 64 controls the spray pattern and an air line (not shown) controls operation of the gun 60.

The spray pattern width is controlled by collecting overspray using adjustable skive manifolds, generally indicated at 66, on each side of the fan spray pattern. The positions of the skive manifolds 66 are programmable by using a single pneumatic servo valve (not shown) responsive to a control signal of line 28 to control the position of a single fan width adjustment cylinder 70. The cylinder 70 moves a linkage assembly 72 to change the position of the skive manifolds 66 from a wide pattern position, as indicated at 74, to a narrow pattern position, as indicated at 76. The linkage assembly 72 rotates the manifold 62 about axes, indicated by pins 78. The half of FIG. 2 to the left of center line 79 shows an extended position of the cylinder 70 for the narrow pattern position 76, and the half of FIG. 2 to the right of the center line 79 shows a retracted position of the cylinder 70 for the wide pattern position 74.

The cylinder 70 may be replaced by other conventional linear servo actuators such as a motor-screw combination.

Figure 4:
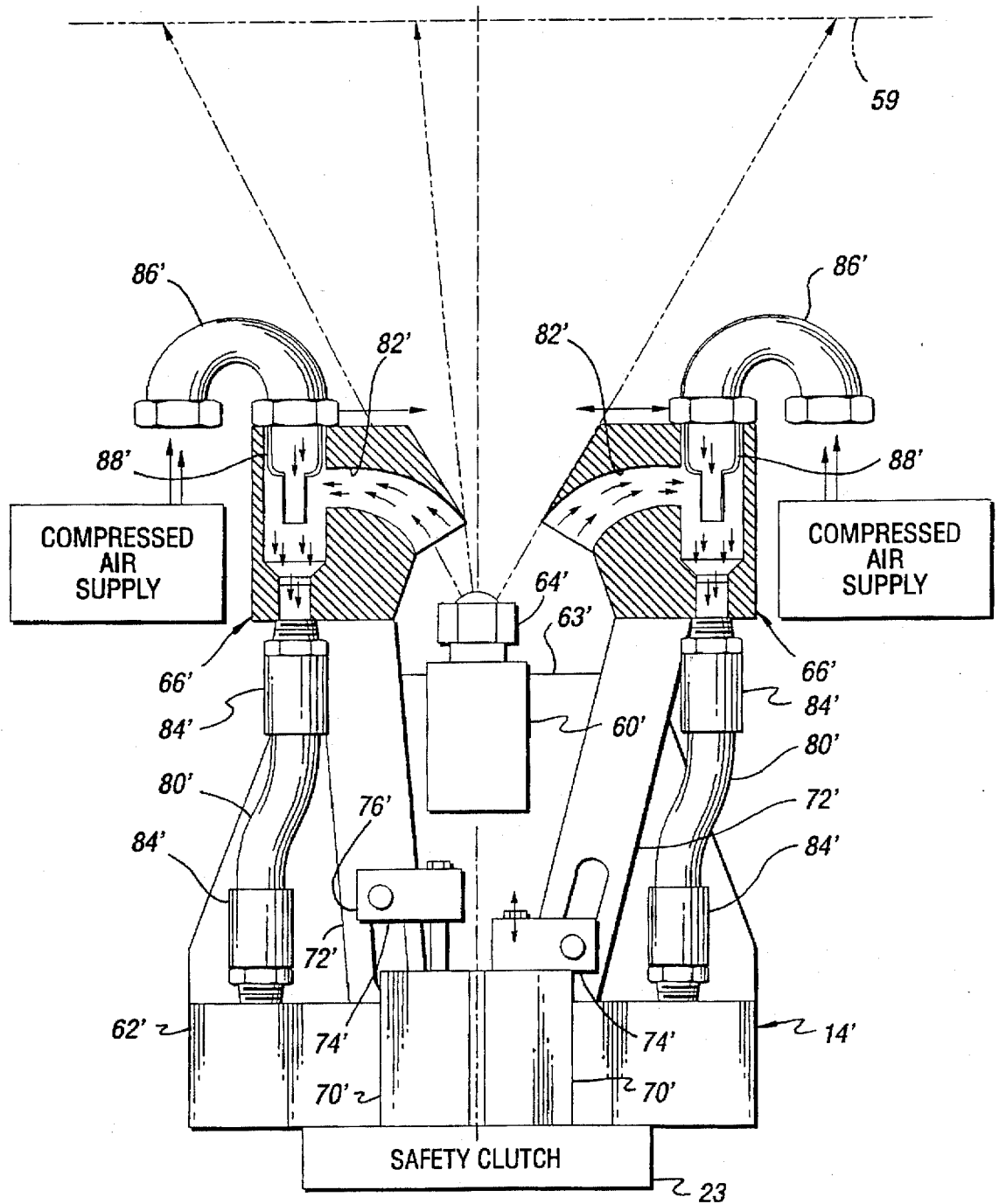
FIG. 4 is a schematic diagram of an assembly, partially in cross-section, having dual servo-cylinder control for spray width control.
Figure 5:
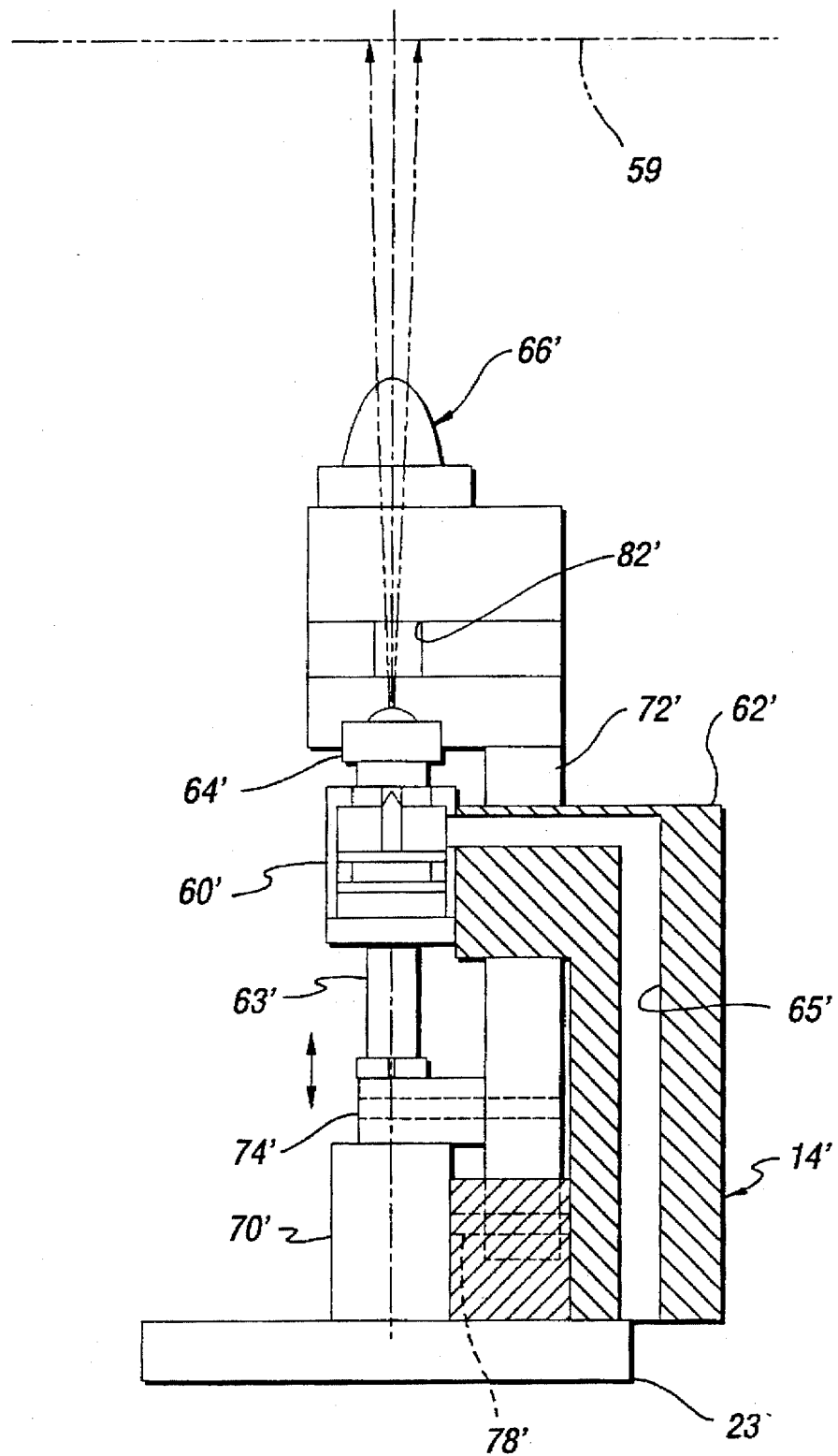
FIG. 5 is a schematic diagram of a dual servo-cylinder for spray width control and for use in the assembly of FIG. 4.

The cylinder 70 acts in tandem on both links 72, as illustrated in FIGS. 2 and 3. In the embodiment of FIGS. 4 and 5, two adjacent cylinders 70', each of which acts independently on one of the two links 72', position the links 72' to desired positions.

In the embodiment of FIGS. 4 and 5, parts which are the same or similar in structure or function to the parts of FIGS. 2 and 3 have the same reference numeral but a single prime designation.

Rotary actuators, such as conventional electric, hydraulic, or pneumatic motors, may also be used to rotate the two links 72 around the hinge pins 78. With the two actuators of the second embodiment, the positions of the two links 72' are controlled independently to obtain non-symmetrical fan patterns. The controller 24 then provides two independent and programmable control signals for independently controlling the positions of the two links 72'.

In another embodiment of the invention, the spray applicator is provided with a plurality of skive manifolds, such as 66. Each skive manifold 66 is controlled by independent actuators to obstruct the path of the spray material independently at selected locations around the sprayed material and define a desired spray pattern. For example, four skive manifolds may define a rectangular spray pattern of varying proportions. The skive manifolds 66 may also be profiled to generate profiled spray pattern edges, especially desirable for many stationary spray applications.

In this way, the positions of the manifolds 66 are programmable and adjusted by the robot program in the robot controller 24 as required for proper application during the spray process. The two extreme positions are shown in FIG. 2 on opposite sides of the spray pattern.

As the edges of the airless spray pattern are contained by the skive manifolds 66, the resulting spray pattern width is controlled dimensionally at the point of application. The overspray material is collected in the skive manifolds 66 which are venturi-type manifolds. The overspray material is then evacuated through the manifolds 66, hoses 80, the manifold 62, couplers 84 which interconnect the hoses 80 to the manifolds 62 and 66, and lines 32 to the recovery tanks 30.

The velocity of the material being sprayed is used to collect the material in chambers 82 formed in the skive manifolds 66 on either edge of the spray pattern. This masking method uses skive edges of the manifolds 66 to split the airless spray pattern forcing excess material into the venturi-type chambers 82, collecting the material for removal by the vacuum operated recovery system 16. The recovered material is then preferably reused.

For example, the recovered material is pumped into the accumulator 44 and thoroughly mixed, either naturally or with a separate mixer, with virgin sealer material. Experience has shown that the recovered material usually looses appreciable amounts of solvents and reduces the spray quality if sprayed directly back on the workpiece. Accordingly, the recovered material is advisably mixed with fresh, unused material. The proportion of the mixing varies with the type of material and can reach up to 30% recovered to 70% fresh material. Since the amount of recovered material is usually much less than 30% of the total material sprayed, almost all of the recovered material can be reused, and appreciable savings are realized from this process.

The masking tool assembly 14 is programmable to vary the resulting fan pattern width. The assembly 14 may use gravity for collecting the material for evacuation. The assembly 14 is compact and can additionally be used for application of underbody coatings. This concept provides the amount of masking required for the spray sealing process. The assembly 14 also provides consistent edge definition of the airless spray patterns on both edges of the pattern to a quality level equivalent to masking by taping materials.

Referring now to FIGS. 2 and 4, there is illustrated apparatus for recovering excess sprayed material. High pressure air from a compressed air supply is injected through a fitting 86 or 86' into a venturi nozzle 88 or 88' at high speed to generate a vacuum at the venturi throat to suck in the excess material. The expanded section after the throat partially recovers the compressed air energy and allows the air to drive the excess material into the recovery lines for flow to the recovery tanks.

Operation

The system of FIG. 1 operates by spraying materials on surfaces using the airless spray applicator 60. The sealer supply hardware 18 provides the material at the proper spray pressure and volume to meet application speed of the robot manipulator 12. The spray pattern width is controlled, with the masking tool assembly 14, by skiving off the edges of the spray pattern. The overspray material is recovered for reuse by the sealer recovery hardware 18. The recovered material is removed from the recovery tanks 30 as required, by the recovery pump 42. Low and high level indicators or sensors 36 and 34, respectively, in the recovery tanks 30 control the operation of the recovery pump 42. The material is filtered by filters of the filter stand 48 prior to being reused. The spray pressure is controlled by the material pressure regulator 50 in the supply line 52 to the airless spray gun 60. Material recovery lines 32 and material supply lines 52 which extend from the masking tool assembly 14 to the recovery and supply hardware 16 and 18, respectively, are routed through the manifolds 62 and 54 with hosing as required for the application.

While the best mode for carrying out the invention has been described in detail, those familiar with the art to which this invention relates will recognize various alternative designs and embodiments for practicing the invention as defined by the following claims.

What is claimed is:

1. A method for spraying a material in a spray pattern having a variable form, the method comprising the steps of:
   a. providing a material supply means for supplying a material which is a fluid;
   b. providing a material spray means for spraying the material from the material supply means along a spray path in a spray pattern having an initial width at a workpiece position spaced from the material spray means along the spray path;
   c. providing a masking means for obstructing a selected portion of the spray path;
   d. operating the material spray means to spray the material along the spray path in the spray pattern;
   e. generating a first set of control signals for moving the masking means to obtain a desired width of the spray pattern at the workpiece position; and
   f. moving the masking means relative to the spray path in response to the first set of control signals to obstruct a selected portion of the spray path of the material to reduce the initial width of the spray pattern to the desired width at the workpiece position.

2. The method according to claim 1 wherein the masking means includes a masking plate profiled to obstruct the selected portion of the spray path to obtain the desired width spray pattern at the workpiece position.

3. The method according to claim 1 wherein the masking means includes two masking elements and said step f. includes coordinating movement of the two masking elements relative to the spray path in response to the first set of control signals.

4. The method according to claim 1 wherein the masking means includes a set of masking plates, each of the masking plates being responsive to one of the control signals of the first set of control signals to independently obstruct the selected portion of the spray path of the material to vary a profile of the spray pattern at the workpiece position.

5. The method according to claim 1 wherein the first set of control signals includes a single control signal.

6. The method according to claim 1 wherein the first set of control signals includes a plurality of control signals.

7. The method according to claim 1 further comprising the step of collecting in the masking means overspray material obstructed by the masking means in the selected portion of the spray path during spraying of the material along the spray path.

8. The method according to claim 7 further comprising the step of returning the collected overspray material from the masking means to the material supply means for reuse during said step d.

9. The method according to claim 7 further comprising the steps of:

evacuating the collected overspray material from the masking means; and storing the evacuated overspray material in a recovery tank.

10. The method according to claim 9 further comprising the steps of:

generating a sense signal when the amount of the overspray material stored in the recovery tank exceeds a predetermined high level; and pumping the stored overspray material from the recovery tank to the material supply means in response to the generation of the sense signal.

11. A method for spraying a material in a spray pattern having variable width and for collecting overspray material, the method comprising the steps of:

a. providing a material supply means for supplying a material which is a fluid;

b. spraying the material along a spray path in a spray pattern having an initial width at a workpiece position along the spray path;

c. generating a first set of control signals for moving a masking means to obtain a desired width of the spray pattern at the workpiece position;

d. providing masking means for selectively obstructing the spray path of the material;

e. moving the masking means relative to the spray path in response to the first set of control signals to obstruct a selected portion of the spray path adjacent a first side of the spray pattern to reduce the initial width of the spray pattern at the workpiece position; and f. collecting a first portion of overspray material obstructed by the masking means adjacent the first side of the spray pattern during the step of spraying.

12. The method according to claim 11 further comprising the steps of:

generating a second set of control signals for moving the masking means;

moving the masking means relative to the spray path in response to the second set of control signals to obstruct a selected portion of the spray path adjacent a second side of the spray pattern to reduce the initial width of the spray pattern to the desired width at the workpiece position; and collecting a second portion of excess material obstructed by the masking means adjacent the second side of the spray pattern during the step of spraying.

13. The method according to claim 12 further comprising the step of returning the collected overspray material to the material supply means for reuse during said step b.

14. The method according to claim 12 further comprising the steps of:

evacuating the collected overspray material from the masking means; and storing the evacuated overspray material in a recovery tank.

15. The method according to claim 14 further comprising the steps of:

generating a sense signal when the mount of the overspray material stored in the recovery tank exceeds a predetermined high level; and pumping the stored overspray material from the recovery tank to the material supply means in response to the generation of the sense signal.

16. The method according to claim 12 wherein the second set of control signals includes a single control signal.

17. The method according to claim 12 wherein the second set of control signals includes a plurality of control signals.

18. A method for the programmable definition of edges of a desired spray pattern of a fluid material and the recovery of overspray material, the method comprising the steps of:

a. providing a plurality of skive manifolds each for obstructing an associated selected portion of a spray path of fluid material being sprayed;

b. providing a storage tank;

c. controlling a position of each of the skive manifolds relative to the spray path to obstruct the associated selected portion of the spray path outside a periphery of a desired spray pattern;

d. collecting overspray fluid material obstructed by the skive manifolds in the selected portions of the spray path during spraying of the fluid material along the spray path; and e. directing the collected overspray fluid material to flow into the storage tank.

* * * * *